UNITED STATES PATENT OFFICE.

ALBERT HERRMANN, OF HÖCHST-ON-THE-MAIN, GERMANY, ASSIGNOR TO THE FARBWERKE, VORMALS MEISTER, LUCIUS & BRÜNING, OF SAME PLACE.

GREEN DYE.

SPECIFICATION forming part of Letters Patent No. 639,976, dated December 26, 1899.

Original application filed December 12, 1898, Serial No. 699,022. Divided and this application filed June 24, 1899. Serial No. 721,687. (No specimens.)

*To all whom it may concern:*

Be it known that I, ALBERT HERRMANN, Ph. D., a citizen of the Empire of Germany, residing at Höchst-on-the-Main, Germany, have invented certain new and useful Improvements in the Manufacture of Green Dyestuffs, (this being a divisional application of Letters Patent No. 630,224, dated August 1, 1899,) of which the following is a specification.

I have found that by adhering to appropriate conditions naphthalenedisulfonic acids may be condensed with tetralkyldiamidobenzhydrols in quantity into leucodisulfonic acids, and, further, that these leucodisulfonic acids yield when oxidized new dyestuffs, which, besides being fast to washing and light, dye very evenly in an acid-bath.

I illustrate my process by the following example: Twenty-seven kilograms of tetramethyldiamidobenzhydrol and thirty-nine kilograms of sodium salt of 2:6 naphthalenedisulfonic acid are well mixed, and the mixture is run into two hundred kilograms of monohydrate sulfuric acid while well stirring. The thickened mass thus resulting is then heated in a boiling-water bath until a sample of it is clearly soluble in diluted ammonia—that is to say, till all hydrol has disappeared. This takes place after from five to six hours. The product of reaction is poured into water and transformed in the usual manner into the calcium or sodium salt. For the subsequent oxidation, to a solution of five kilograms of the leuco-salt thus obtained in about forty liters of water is added the calculated quantity of sulfuric acid, and this liquid while well stirring is poured into 2.04 kilograms of peroxid of lead mixed with water. The sulfate of lead is then filtered off and the dye solution is evaporated to dryness.

Having now described my invention, what I claim is—

As a new product the dyestuff obtained by condensing tetralkyldiamidobenzhydrol with 2:6 naphthalenedisulfonic acid and by oxidizing the resulting leuco compound, the dyestuff being a copper-red powder of metallic luster, easily soluble in water with a green color, soluble with difficulty in alcohol, insoluble in benzene, dyeing wool in an acid-bath an even green fast to washing and light, having the probable constitution:

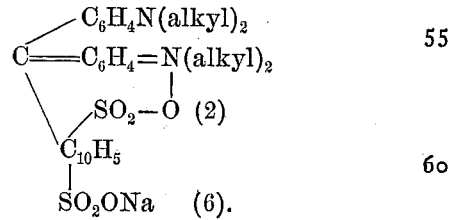

In testimony that I claim the foregoing as my invention I have signed my name in presence of two subscribing witnesses.

ALBERT HERRMANN.

Witnesses:
  HEINRICH HAHN,
  ALFRED BRISBOIS.